United States Patent [19]

Serafin

[11] 4,092,902
[45] June 6, 1978

[54] LATHE ATTACHMENT FOR GENERATING SPHERICAL SURFACES

[76] Inventor: Joseph W. Serafin, 222 Flat Hills Rd., Amherst, Mass. 01002

[21] Appl. No.: 772,544

[22] Filed: Feb. 28, 1977

[51] Int. Cl.² .................... B23B 3/22; B23C 3/04
[52] U.S. Cl. ................... 90/11 D; 90/DIG. 1; 407/38
[58] Field of Search ............ 90/DIG. 1, 11 R, 14, 90/15, 11 D; 82/12; 29/105 A

[56] References Cited

U.S. PATENT DOCUMENTS

| | | | |
|---|---|---|---|
| 1,165,859 | 12/1915 | Ebert | 29/105 A |
| 1,719,689 | 7/1929 | Buehrle | 90/DIG. 1 |
| 2,074,844 | 3/1937 | Hill | 90/DIG. 1 |
| 2,140,957 | 12/1938 | Hanna | 90/DIG. 1 |
| 2,629,292 | 2/1953 | McCullough | 90/11 R X |

FOREIGN PATENT DOCUMENTS 655,316  7/1951  United Kingdom ............... 90/15 R

*Primary Examiner*—Gil Weidenfeld
*Attorney, Agent, or Firm*—Dike, Bronstein, Roberts, Cushman & Pfund

[57] ABSTRACT

An attachment for a conventional lathe having work-supporting means for rotating a workpiece about a predetermined axis, a cross slide movable at right angles to the axis of rotation of the work supporting means and motor means for effecting rotation of the work supporting means and traversing of the cross slide, said attachment being designed to support a tool for rotation about an axis situated in a plane containing the said predetermined axis and for rectilinear movement axially at right angles to said predetermined axis. The tool is provided with one or more cutting elements such as a bit or a plurality of bits arranged at an angle of substantially 18 degrees to the axis of rotation of the tool. Other cutting devices may be substituted for the bits as, for example, grinding tools, lapidaries, twist drills, routing tools and the like. The attachment as thus described is particularly adapted to generating spherical surfaces to a high degree of accuracy and surface smoothness.

5 Claims, 15 Drawing Figures

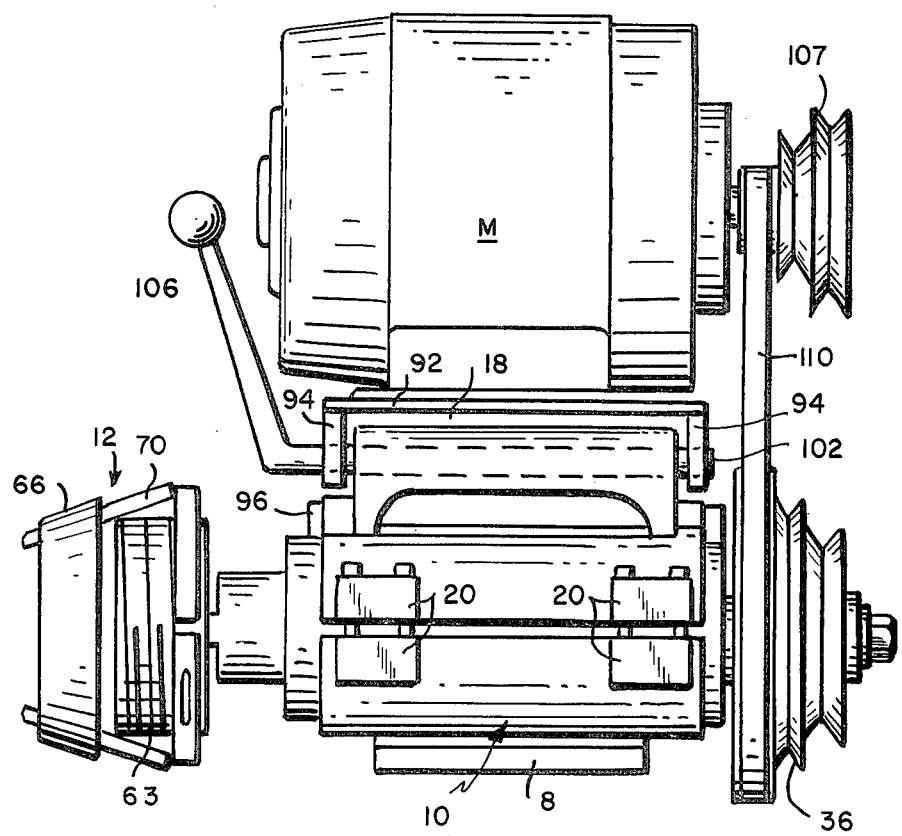
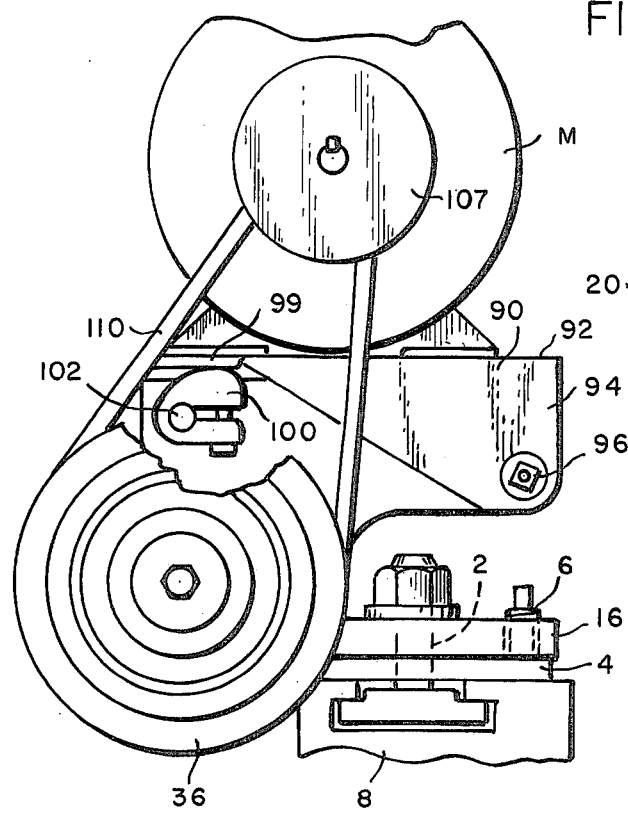
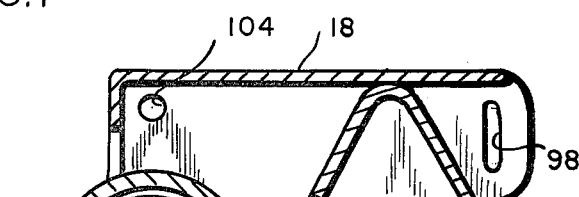
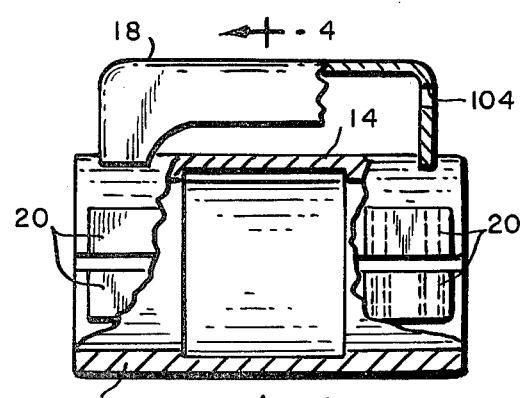

LATHE ATTACHMENT FOR GENERATING SPHERICAL SURFACES

BACKGROUND OF THE INVENTION

There are many attachments designed to be attached to standard lathes for the purpose of performing special operations, most such attachments requiring substantial alterations in the basic lathe structure, special mounting techniques, multiple adjustments and the like so that they have little use but for a single operation and leave little possibility for making a run of sizes of a particular configuration. The attachment as herein illustrated is designed to be attached to the cross slide of a conventional lathe without disturbing, dismounting or altering the structure of the lathe and without requiring the assistance of a trained or skilled shopworker to make the attachment and is provided with a cutting head which may be readily adjusted to generate spherical surfaces of highly accurate dimensions and a high degree of surface smoothness.

SUMMARY OF THE INVENTION

The device is used in combination with a lathe having a power driven work supporting means for rotating a workpiece about a predetermined axis and power driven cross slide means movable at right angles to said predetermined axis of rotation of the workpiece and comprises an attachment adapted to be mounted to the cross slide for movement therewith at right angles to said axis and for supporting a tool for rotation about an axis in a plane containing said predetermined axis and means for effecting rotation of the work supporting means, traversing movement of the cross slide and rotation of the tool. The attachment is designed to enable positioning the axis of rotation of the tool in a plane containing the axis of rotation of the workpiece for movement axially along its axis of rotation at right angles to the axis of rotation of the workpiece. The tool comprises a cutting head embodying a plurality of bits fixed thereto at predetermined radial distances about said predetermined axis of rotation of the cutting head wherein the axis of each bit is disposed at an angle of substantially 18 degrees to the axis of rotation of the cutting head. The attachment embodies a spindle supported thereby for rotation about said predetermined axis, means at one end of the spindle for effecting its rotation and means at the other end for mounting the cutting head thereto. For mounting the cutting head to the spindle, the latter contains at said other end a conical opening. The cutting head is provided with a conical adapter and a drawbar with a head at one end and a thread at the other end is rotatably mounted in the spindle for drawing the adapter into the conical opening of said other end of the spindle. The bits are adjustable axially in the cutting head and there is means on the cutting head for engagement with the distal ends of the bits to prevent axial movement thereof following adjustment. A motor support is pivotally mounted on the attachment for pivotal movement about an axis parallel to said axis of rotation of the spindle and for heightwise movement relative to said axis of the spindle and cams are supported in engagement with the distal edge of the motor support for rotation to adjust the motor support angularly about its axis. The attachment embodies a housing for rotatably receiving the spindle and the housing is designed to enable reversing the spindle end-for-end therein while the motor support is reversibly mounted to the attachment so as to enable reversing its position when the position of the spindle is reversed. There is shim means for adjusting the heightwise position of the assembly relative to the cross slide according to the size of the lathe to substantially the exact level of the axis of rotation of the workpiece and adjusting screws for bringing the assembly to the exact level.

The invention will now be described in greater detail with reference to the accompanying drawings, wherein:

FIG. 1 is a side elevation of the attachment mounted to the cross slide of a conventional lathe, the latter not being shown;

FIG. 2 is an elevation of the attachment shown in FIG. 1 as seen from the right side of FIG. 1;

FIG. 4 is a transverse section of the frame of the attachment with the spindle omitted and the motor support omitted;

FIG. 5 is an elevation partly in section as seen from the left side of FIG. 4;

Figure 12:
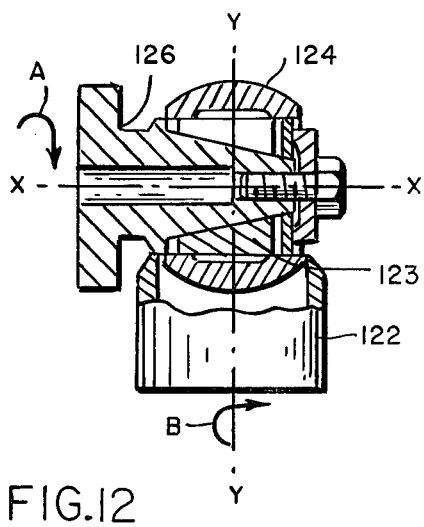
Figure 13:
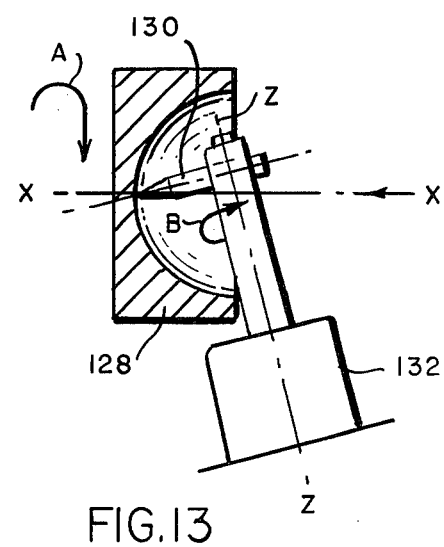
Figure 14:
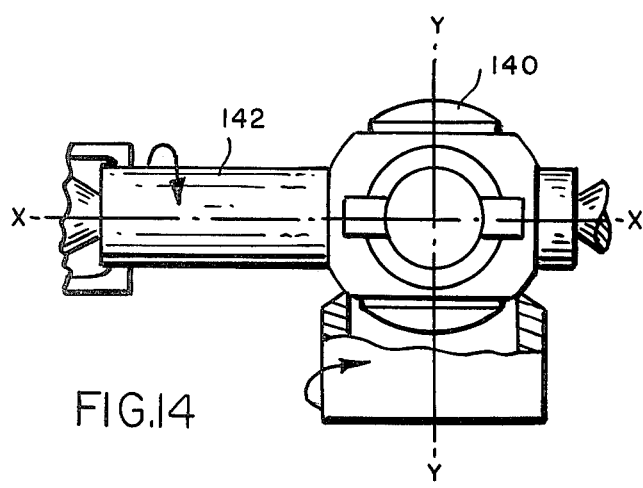
Figure 15:
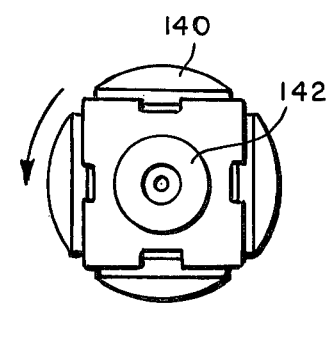

FIG. 12 diagrammatically shows the use of a grinding wheel for forming a spherical surface;

FIG. 13 diagrammatically shows the use of the cutting tool for generating a concave spherical surface;

FIG. 14 is an elevation of an adaptation of the device for grinding glass lens blanks; and FIG. 15 is an elevation as seen from the right side of FIG. 14.

Figure 3:
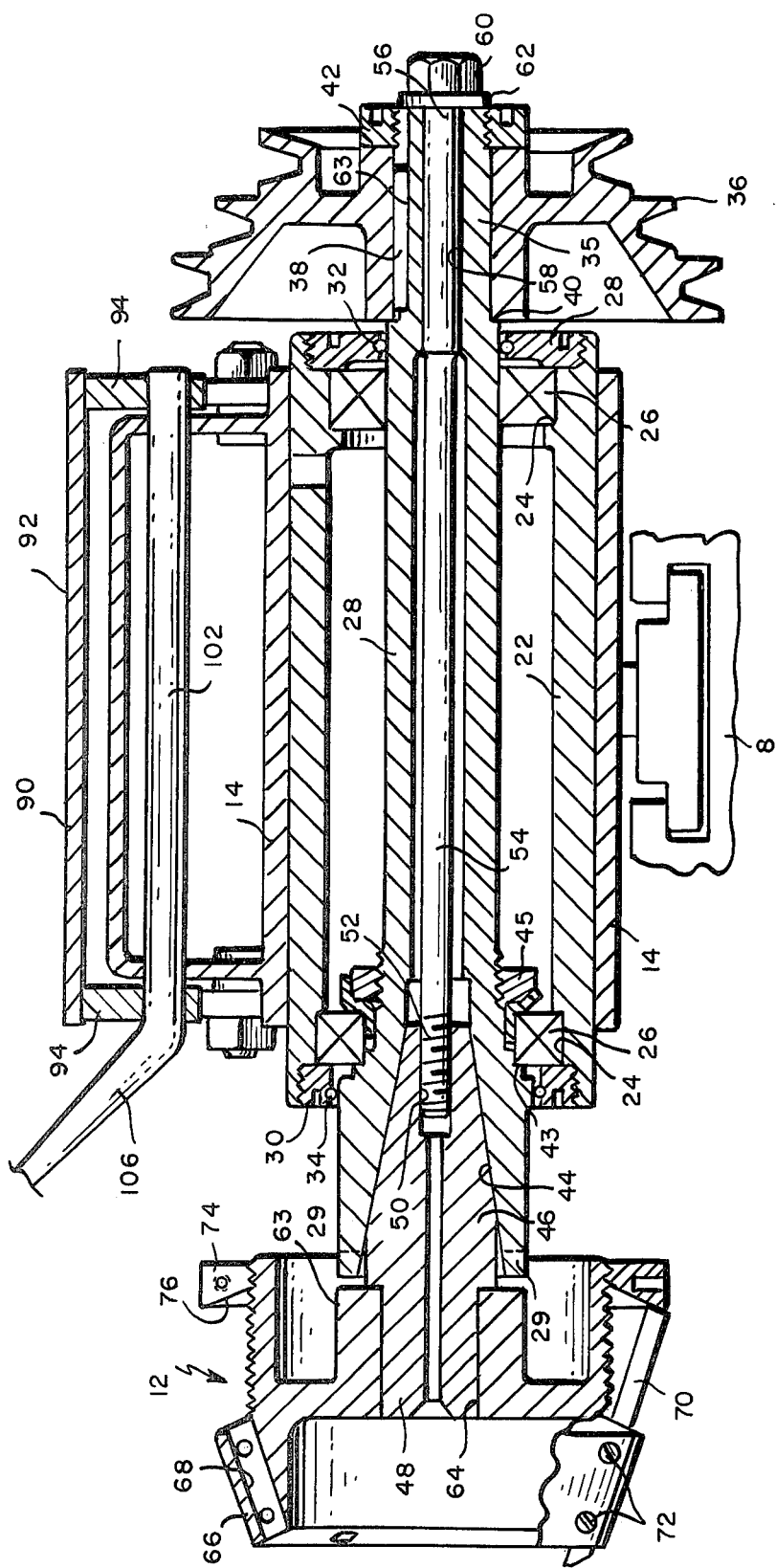
FIG. 3 is an enlarged longitudinal section taken on the axis of the spindle to which the tool is attached for rotation, with the motor drive omitted.

Referring to the drawings, FIGS. 1 and 2, the attachment comprises essentially an assembly 10 adapted to be mounted to a conventional lathe, for example, to the cross slide 8. The assembly itself mounts a cutting tool 12 and a motor M for driving the cutting tool. The assembly as shown in FIGS. 4 and 5 comprises a fabricated structure embodying an elongate cylindrical body portion 14, a flat mounting plate 16 adapted to be bolted to the cross slide of the lathe and a platform 18 for a motor support. The cylindrical portion 14 is split along one side as shown in FIGS. 4 and 5 and provided with spaced pairs of lugs 20—20 containing vertically disposed bolt holes. A cylindrical spindle housing 22, FIG. 3, is inserted into the body portion 14 and rigidly clamped therein by means of bolts inserted in the pairs of lugs 20—20. The cylindrical housing 22 contains at its opposite ends annular recesses 24—24 for receiving circular ball bearing assemblies 26—26, the latter, in turn, rotatably receiving a spindle 28, the spindle being of such length that its opposite ends project from the opposite ends of the housing. A retainer nut 28 is threaded into the right-hand end of the housing as shown in FIG. 3 to hold the ball bearing assembly 26 at that end in place and a retainer nut 30 is threaded into the left-hand end of the housing to hold the ball bearing assembly 26 at that end in place. Sealing rings 32 and 34 are provided between the inner sides of the retaining nuts and the spindle to exclude dirt and dust. The right-hand end of the spindle 28 is reduced in cross section to provide a hub 35 and has mounted thereon a drive pulley 36 which is keyed thereto by means of a key 38 so that its rotation will impart rotation to the spindle and is secured against axial movement against an annular shoulder 40 at the junction of the hub with the spindle by a retaining nut 42 screwed onto the end of the hub. The left-hand end of the spindle 28 externally of the housing is of larger diameter and contains a longitudinally extending, conical-shaped opening 44. At the junction of the enlargement there is a shoulder 43 which is held against the outer side of the bearing assembly 26 at that end by a nut 45 screwed on the spindle against the inner side of the bearing assembly. The left-hand end of the spindle has two keys 29—29 for receiving keyways 31—31 milled into the various adapters.

The assembly is mounted to the cross slide 8 of the lathe on a bolt 2 with a shim plate 4 interposed between the cross slide and the mounting plate 16. The thickness of the shim plate will depend upon the size of the lathe and is made so as to bring the level of the axis of the spindle to the exact same level as the axis of rotation of the workpiece. Additionally, adjusting screws 6—6 are provided for fine adjustment of the level by as much as 0.005 inches.

The tool 12 which takes various forms, as will be described hereinafter, is mounted to the spindle 28 so as to be rotated thereby by means of an adapter 46 which is of conical configuration having at one end a cylindrical hub 48 for receiving the tool and its other end a threaded opening 50 for receiving the threaded end 52 of a drawbar 54. The drawbar has at its opposite end a cylindrical portion 56 adapted to be slidably engaged within an axial hole 58 in the hub of the spindle provided with a head 60 and flange 62 so that by rotation in the spindle, the adapter 46 can be drawn tightly into engagement with the spindle so as to rotate with the latter.

The cutting tool 12 as shown in FIG. 3 comprises a cutting head 63 of generally circular cross section which contains a centrally located opening 64 for telescoping engagement with the hub 48 at the left-hand end of the adapter and is rigidly fixed thereby by the process of shrink-fitting, becoming one piece, although it is to be understood that other means of attachment could be used such as silver soldering. The head has at its forward side an annular rim 66 peripherally of which there are a plurality of uniformly spaced square holes 68 situated at equal radial distances from the center of rotation, the holes being made so that their axis make an angle of substantially 18° with the axis of the spindle. This angle may be varied depending upon the operation being performed. The holes 68 are designed to receive cutting elements 70 in the form of elongate cutting bits provided with carbide tips which are mounted therein and secured when properly mounted by means of clamp screws 72 threaded into holes against the bits provided for this purpose. There are six such bits shown in FIG. 3. In order to adjust the bits longitudinally, there is screwed onto the rear side of the cutting head a retaining ring 74, the forward side or face of which is provided with a surface 76 which is inclined at an angle so as to be parallel with the rear ends of the bits.

Figure 6:
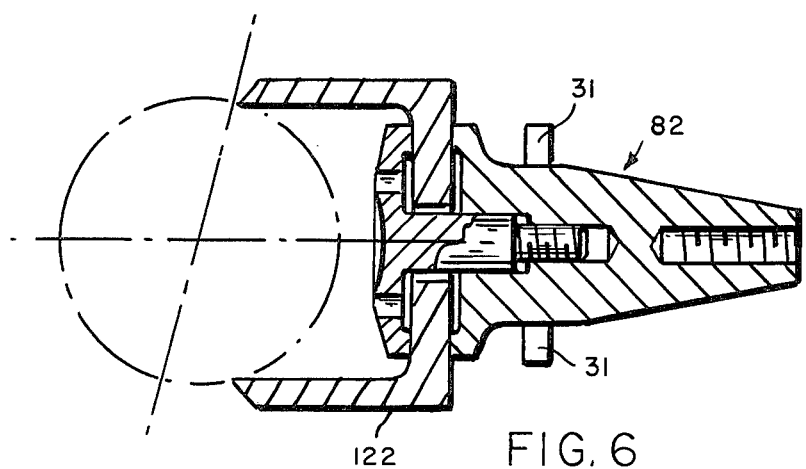
FIG. 6 is a section of an adapter for a grinding wheel.
Figure 7:
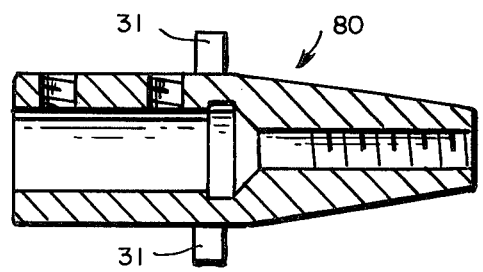
FIG. 7 is a section of an adapter for an end mill.
Figure 8:
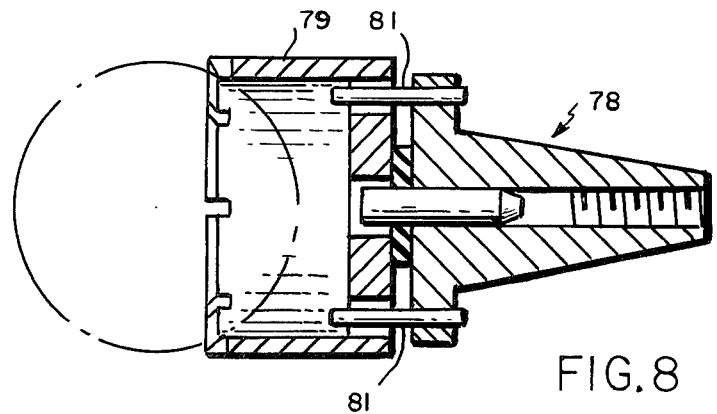
FIG. 8 is a section of an adapter for a lapidary.
Figure 9:
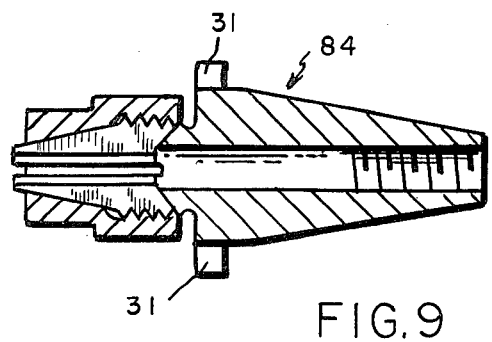
FIG. 9 is a section of a collet.

The cutting head shown in FIG. 3 is designed particularly for generating spherical surfaces. However, it is possible to use the apparatus for other than grinding purposes, for example, a lapping adapter 78 may be substituted for the adapter 46, as shown in FIG. 8. The lap 79 as shown in FIG. 8 is flexibly attached to the adapter by means of pins 81—81 with a rubber ring 83 interposed between the lap and the adapter. An end mill adapter 80 may be substituted for the adapter 46 as shown in FIG. 7. For the purpose of rounding off hardened work, a grinding wheel adapter 82 is employed as shown in FIG. 6. It is also possible to substitute for the adapter 46 collet 84 as shown in FIG. 9. The hollow, cup-shaped grinding wheel provides for trueing a surface which has been hardened. If, however, precision is required, whether a hard or soft surface, the hollow, loosely supported lap 79 of FIG. 8 is employed. The axis of the work and the lap need not be in line with each other nor at right angles to one another since their respective rotations cancel out irregularities which results in a perfectly true sphere with a surface smoothness of one microinch or better.

For driving the spindle 28, there is provided, as heretofore mentioned, a variable speed motor M and this motor, as shown in FIGS. 1 and 2, is mounted on a motor support 90 provided with a flat platform 92 and spaced parallel legs 94—94 by means of which it is pivotally mounted for angular movement about a horizontal axis parallel to the axis of the spindle on bolts 96—96 adjustable heightwise in slots 98—98, FIG. 4, to permit raising and lowering the motor support to accommodate a new or worn belt. The motor support 90 is provided with a bearing plate 99, FIG. 2, comprising an integral part of the support 90 which rests upon the surface of cams 100 clamped to a shaft 102 rotatably journaled in openings 104—104 in the body structure and provided at its forward end with a lever 106 by means of which the cams may be partially rotated. The motor M has fixed to its drive shaft a pulley 107 and a V belt 110 entrained about the pulley 107 and the pulley 36 drives the spindle. The cams 100 provide for tightening the belt.

Figure 10:
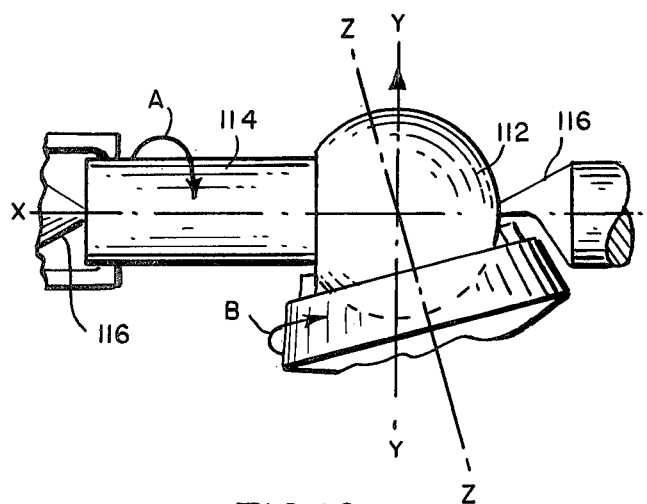
FIG. 10 is a diagrammatic illustration of the use of a cutting head for forming a spherical member between centers.

As related earlier, the attachment is designed especially for generating spherical surfaces. FIG. 10 is illustrative of one kind of spherical surface which may be generated and the relation of the support means for the workpiece being operated upon and the tool comprising the cutting head. The spherical surface 112 is being formed at the end of a neck 114 and is supported for rotation about an axis X—X located in a horizontal plane between fixed centers 116—116 of known kind provided in the head and tail stocks of the lathe and is rotated, while so supported, in the direction of the arrow A. The support means for the workpiece is adjusted heightwise with respect to the axis of rotation of the spindle Z—Z so that the axis X—X about which the workpiece is rotated and the axis of rotation of the cutting head Z—Z lie in the same horizontal plane. The cutting head is rotated about its axis in the direction of the arrow B and is moved rectilinearly by means of the cross slide of the lathe in a direction Y—Y which is perpendicular to the axis X—X. The 18 degree tool angle as mentioned above is particularly suitable when machining spheres mounted between centers as illustrated in FIG. 10. However, this angle may be varied depending upon the operation being performed.

Figure 11:
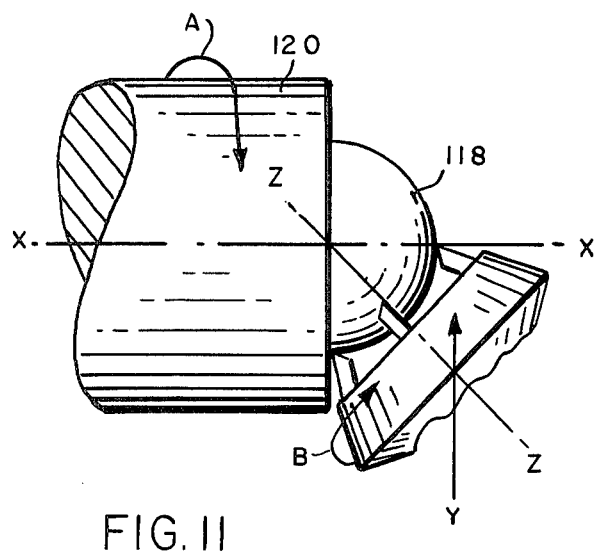
FIG. 11 is a view similar to FIG. 10 showing formation of a hemispherical surface.

FIG. 11 shows an operation in which a spherical surface 118 is generated at the end of a part 120 of larger diameter, the latter being held and rotatably driven in a chuck, collet or in a steady rest by the head stock of a lathe, for rotation about a horizontal axis X—X lying in a plane containing the longitudinal axis Z—Z of the cutting head. The cutting head rotates in the direction of the arrow B and is moved in the direction of the axis Y—Y at right angles to the axis X—X.

FIG. 12 illustrates another operation wherein a grinding wheel 122 such as was referred to and illustrated in FIG. 6 is used to generate a spherical surface on an annular member 124. The annular member 124 is mounted for this purpose to an adapter 126 which is clamped to the face plate of the lathe for rotation about a horizontal axis X—X lying in a plane containing the axis of rotation Y—Y of the cutting head and rectilinearly in a direction at right angles to the axis X—X. The grinding wheel itself is rotated about its axis Y—Y, that is, the axis of the spindle in the direction of the arrow B and is moved in a direction Y—Y perpendicular to the axis X—X. An expandable sleeve 123 is used to clamp the member 124 to the adapter.

The device may be used as shown in FIG. 13 for generating a concave spherical surface. The workpiece 128 is mounted to a suitable support for rotation about an axis X—X lying in the plane of the axis of the spindle and for rotation about the axis X—X in the direction A. The spindle is provided with a cutting tool 130 fixed to an adapter 132 for rotation about its axis Z—Z in the direction of the arrow B and movement along a line coinciding with the axis X—X.

FIGS. 14 and 15 illustrate a use of the device for grinding and lapping lens blanks. For this purpose, the lens blanks 140 are cemented to a mandrel 142 centered to rotate about an axis X—X and the grinding wheel 144 is rotated about an axis Y—Y in the same plane as the axis X—X.

The device as herein illustrated is of relatively simple construction and can be readily mounted to any conventional lathe for traversing with respect to a suitably supported workpiece and provides a versatility that is not generally embodied in tools of this kind, with any turning machine such as an engine or turret lathe of approximately 14 inch swing or greater with no unusual adaptation nor of the dismantling of any of the machine parts such as compound or cross slides. The device is portable in that it can be easily mounted and dismounted from a conventional lathe, can produce spherical surfaces on diameters of from ¼ inch up to 6 inches with the curvature accurate to within 0.0001 inch and a surface smoothness of 1 microinch or better on either soft or hardened materials and even on glass.

While the cutting bits are preferably disposed at an angle of 18° to the axial center line of the spindle, a somewhat steeper angle may be used if desired.

The design of the mounting for the spindle is such as to enable mounting the spindle from either end of the body and the motor can also be turned end-for-end and the belt loosening and tightening lever may similarly be reversed.

The raising and lowering of the motor support provides for accommodating a new or wearing belt.

It should be understood that the present disclosure is for the purpose of illustration only and includes all modifications or improvements which fall within the scope of the appended claims.

I claim:

1. An attachment for a lathe comprising a cutting head, a motor and mounting structure therefor, said mounting structure comprising a base plate for attachment to the cross slide of a lathe, a housing comprising an elongate, substantially cylindrical clamp, a shelf for mounting the motor, a bearing sleeve clamped in the housing, said bearing sleeve having at its opposite ends bearings, a drive sleeve rotatably mounted in said bearings with its ends extending from the ends of the housing, an internally conical opening in one of the projecting ends of the drive sleeve, an internally cylindrical opening in the other projecting end of the drive sleeve, said cutting head being of circular right section containing at one end peripherally spaced holes, the axes of which converge toward said one end of the head, cutters fixed in the holes and a conical neck at the other end concentric with the axis of the head, said head being mounted to the drive sleeve with said conical neck engaged within said conical opening, a spindle threaded at its opposite ends mounted in the drive sleeve with one of its threaded ends threaded into the conical neck and its other end extending through said cylindrical opening, a nut threaded onto said other threaded end of the spindle against the end of the drive sleeve, clamping the conical neck within the conical opening for rotation of the head with the drive sleeve, a pulley fixed to the drive sleeve, a motor bolted to the shelf and means drivably connecting the motor to the pulley.

2. An attachment according to claim 1 wherein the housing is axially split along one longitudinal side and there is means for clamping the bearing sleeve in the housing comprising axially-spaced bosses on the housing at opposite sides of the split, and bolts extending through the bosses clampingly contracting the housing about the bearing sleeve.

3. An attachment according to claim 1 comprising means for preventing axial movement of the drive sleeve within the bearing sleeve, said means comprising bearing members within the bearing sleeve within which the drive sleeve is rotatably supported, and annular washers threaded into the ends of the bearing sleeve against said bearings.

4. An attachment according to claim 1 comprising a platform pivotally mounted on the shelf to which the motor is bolted and cam means for adjusting the platform angularly about said pivot means.

5. An attachment according to claim 1 wherein the axis of rotation of the drive sleeve and, hence, of the head is supported by said attachment at the level of the axis of rotation defined by the head and tail stocks of the lathe and there is a fine adjustment comprising screw means threaded into the base against the cross slide for accurately leveling the cutting head with respect to the axis defined by the head and tail stocks of the lathe.

* * * * *